United States Patent [19]

Inoue et al.

[11] Patent Number: 5,276,524
[45] Date of Patent: Jan. 4, 1994

[54] WIDE DISPLAY WITH TWO CRTS ARRANGED TO FORM A NON-OVERLAPPING JUXTAPOSED IMAGE WITH ONE CRT MOVABLE FROM AN ACCOMMODATED POSITION TO AN OPERATIVE POSITION

[75] Inventors: Masahiro Inoue; Yuji Tamura, both of Hyogo, Japan

[73] Assignee: Konami Kogyo Kabushiki Kaisha, Hyogo, Japan

[21] Appl. No.: 894,369

[22] Filed: Jun. 4, 1992

[30] Foreign Application Priority Data

Jun. 5, 1991 [JP] Japan .................. 3-134079

[51] Int. Cl.⁵ .................. H04N 5/74; H04N 5/64
[52] U.S. Cl. .................. 358/237; 353/37; 312/7.2; 312/30; 312/223.2; 273/DIG. 28; 248/917
[58] Field of Search .............. 358/231, 254, 237, 238, 358/231, 60, 56; 353/31, 34, 37; 312/7.2, 223.2, 30, 7.1; 273/DIG.; 248/917; H04N 5/74, 5/64

[56] References Cited

U.S. PATENT DOCUMENTS

| 2,677,722 | 3/1954 | Bedford | 358/237 |
| 2,845,618 | 1/1954 | Huffman | 358/254 |
| 2,975,415 | 3/1961 | Klasens | 358/237 |
| 3,944,734 | 3/1976 | Ogawa | 358/254 |
| 4,084,194 | 4/1978 | Hector | 358/254 |
| 4,440,457 | 4/1984 | Fogelman | 312/7.1 |
| 4,621,814 | 11/1986 | Stepan | 273/DIG. 28 |
| 4,707,746 | 11/1987 | Nishikawa | 358/231 |
| 5,181,122 | 1/1993 | Ooishi | 358/237 |

FOREIGN PATENT DOCUMENTS

| 48-25678 | 3/1973 | Japan | H04N 5/68 |
| 0170685 | 10/1982 | Japan | 358/60 |
| 58-219881 | 12/1983 | Japan | H04N 5/68 |
| 230579 | 10/1986 | Japan | H04N 5/740 |
| 160190 | 6/1989 | Japan | H04N 5/740 |
| 2136255 | 2/1983 | United Kingdom | 358/254 |
| 2245808 | 1/1992 | United Kingdom | H04N 5/645 |

Primary Examiner—James J. Groody
Assistant Examiner—Chris Grant
Attorney, Agent, or Firm—Jordan and Hamburg

[57] ABSTRACT

A display device is provide with a main screen, first and second CRTs, and holder mechanism. The first CRT is disposed within a housing of the display device and faces in a vertical direction. The second CRT faces in a horizontal direction and is movable between an operative position where it projects from a rear portion of the housing and an accommodated position where it is accommodated within the housing. The second CRT is held in the operative position by the holder mechanism. The first and second CRTs are arranged so that an image from the first CRT is displayed on the main screen in non-overlapping juxtaposition to an image from the second CRT. The display device thus constructed is capable of displaying on the main screen a sound wide picture which provides a dynamic atmosphere, and the depth thereof is substantially reduced, thereby facilitating transportation thereof even through narrow space.

11 Claims, 8 Drawing Sheets

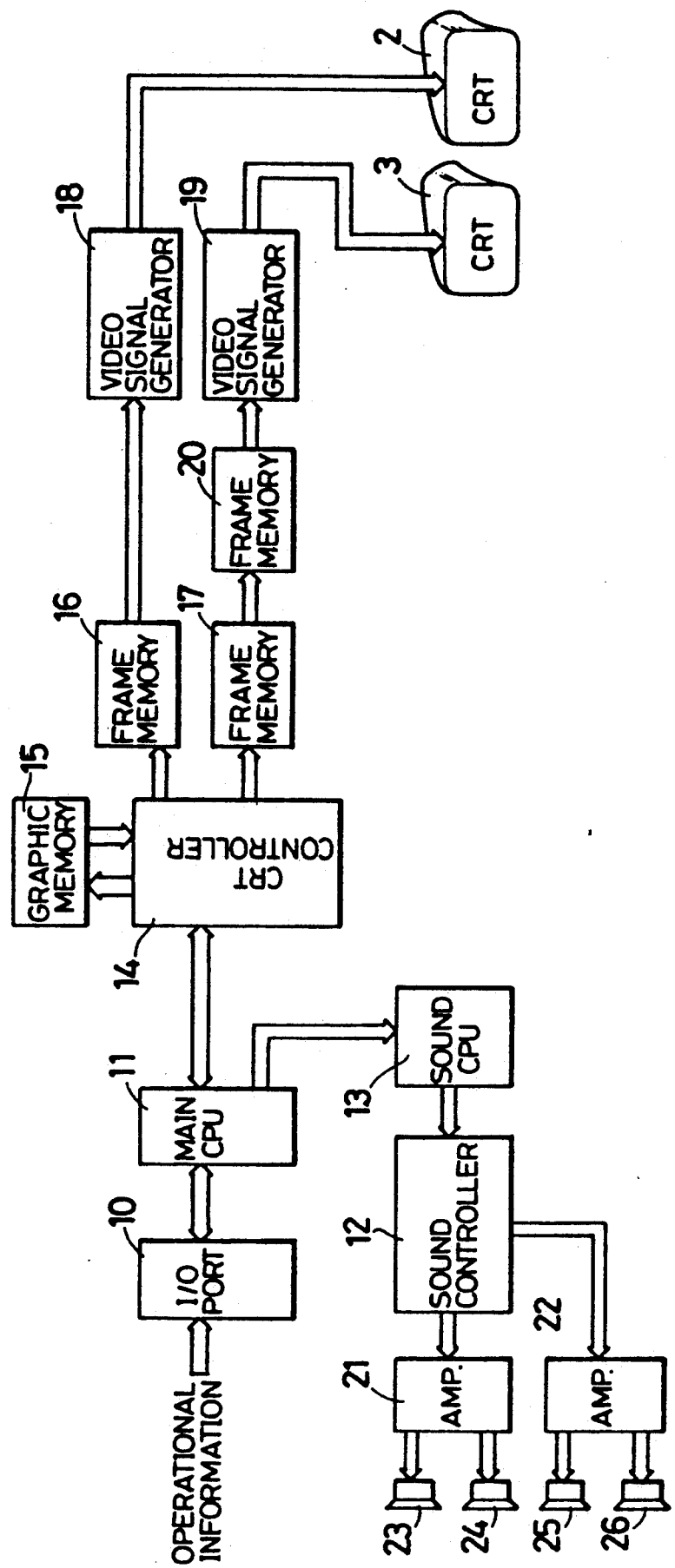

WIDE DISPLAY WITH TWO CRTS ARRANGED TO FORM A NON-OVERLAPPING JUXTAPOSED IMAGE WITH ONE CRT MOVABLE FROM AN ACCOMMODATED POSITION TO AN OPERATIVE POSITION

BACKGROUND OF THE INVENTION AND PRIOR ART STATEMENT

This invention relates to a computerized visual game machine in which images are projected from two or more image generator units to produce and display a wide picture on a screen.

Recently, there have been proposed computerized visual game machine (hereinafter referred to as "TV game machine") capable of displaying such a picture produced by combining a plurality of images as to provide players with a dynamic atmosphere with a lot of presence, using a plurality of CRTs and mirrors. The TV game machines of this type are disclosed in, for example, Unexamined Japanese Utility Model Publication No. 48-25678 and Unexamined Japanese Patent Publication No. 58-219881. However, in these TV game machines, if CRTs are arranged in contact with one another in a transverse direction of the screen, joining lines appear in a produced picture. As a result, the dynamic atmosphere the picture provides is subdued. In view of this, the conventional TV game machines have adopted the following construction. One CRT (hereinafter referred to as a first CRT) is arranged with facing upward in a lower portion of a main body is the TV game machine. A half reflector mirror is disposed above the first CRT with inclined forward, and thereby an image produced by the first CRT is reflected by the half reflector mirror and transmitted forward. Further, a second CRT is arranged in a position offset sideways relative to the first CRT and behind the half reflector mirror. Images produced by thus arranged CRTs are combined as one picture on the screen.

In the above TV game machine, since the second CRT is arranged behind the half reflector mirror, it inevitably projects rearward from a rear surface of the machine main body. Accordingly, the depth of the TV game machine becomes larger by the projected amount. This makes difficult transportation of the TV game machine to an amusement parlor or the like through narrow space and increases the undesired likelihood that the expensive second CRT is struck against obstacles and damaged during transportation thereof.

Particularly in the recent years, there have been proposed large-sized TV game machines with which a plurality of players can simultaneously play a game. Most of these large-sized TV game machines cannot be at present installed into the game parlor with completely assembled. It is of urgent necessity to overcome this problem.

SUMMARY OF THE INVENTION

In view of the above problems, it is an object of the invention to provide a computerized visual game machine which is capable of producing a wide picture satisfactorily and presents no difficulty in transporting the same.

Accordingly, the invention pertains to a display device for displaying a wide picture comprising a housing having a front portion and a rear portion, a main screen provided in the front portion of the housing over which the wide picture is to be produced, first picture projector means including a first picture generation unit having a first screen facing in a vertical direction, first picture transmission means for transmitting a picture produced on the first screen to the main screen, second picture projector means including a second picture generation unit movable between an accommodated position where the picture generation unit is accommodated in the housing and an operative position where the picture generation unit is projected from the rear portion of the housing, and having a second screen facing in a horizontal direction when the second picture generation unit is in the operative position, second picture transmission means for transmitting a picture projected on the second screen to the main screen, the first picture projector means and the second picture projector means being arranged so that an image from the first picture projector means is displayed on the main screen in non-overlapping juxtaposition to an image from the second picture projector means, and first holder means for holding the second picture generation unit in the operative position.

With the display device thus constructed, the image transmitted from the second picture generation unit held in the operative position and that transmitted from the first picture generation unit are combined to produce a wide picture on the main screen. The second picture generation unit projects from the rear portion of the housing in the operative position. However, the second picture generation unit can be accommodated within the housing by releasing a held state thereof in the operative positive and moving the same to the accommodated position. Thereby, the overall depth of the display device can be reduced by a projected amount of the second picture generation.

It may be advantageous to provide second holder means for holding the second picture generation unit in the accommodated position. With this holder means, it can be prevented that the second picture generation unit moves within the housing while the display device is transported.

It may be also advantageous to provide an operation unit detachably mountable to the front portion of the housing. When mounted to the front portion of the housing, the operation unit allows a player to play a game. On the other hand, when detached from the housing, the overall of the display device can be further reduced.

Further, it may be preferable to construct the operation unit rotatable between an open position where the operation unit is away from the front portion of the housing and a closed position where the operation unit substantially covers the front portion of the housing. Thus constructed operation unit permits a maintenance person to have an easier access to devices provided in the housing when rotated to the open position in the mounted state. This obviates the need for detaching the operation unit from the housing each time the maintenance person checks devices provided in the housing.

These and other objects, features and advantages of the present invention will become more apparent upon a reading of the following detailed description and accompanying drawings.

BRIEF DESCRIPTION OF THE DRAWINGS

FIG. 8 is a block diagram showing a construction of a control system provided in the TV game machine.

DETAILED DESCRIPTION OF PREFERRED EMBODIMENTS OF THE INVENTION

An embodiment of the invention will be described with reference to FIGS. 1 to 8.

Figure 1:
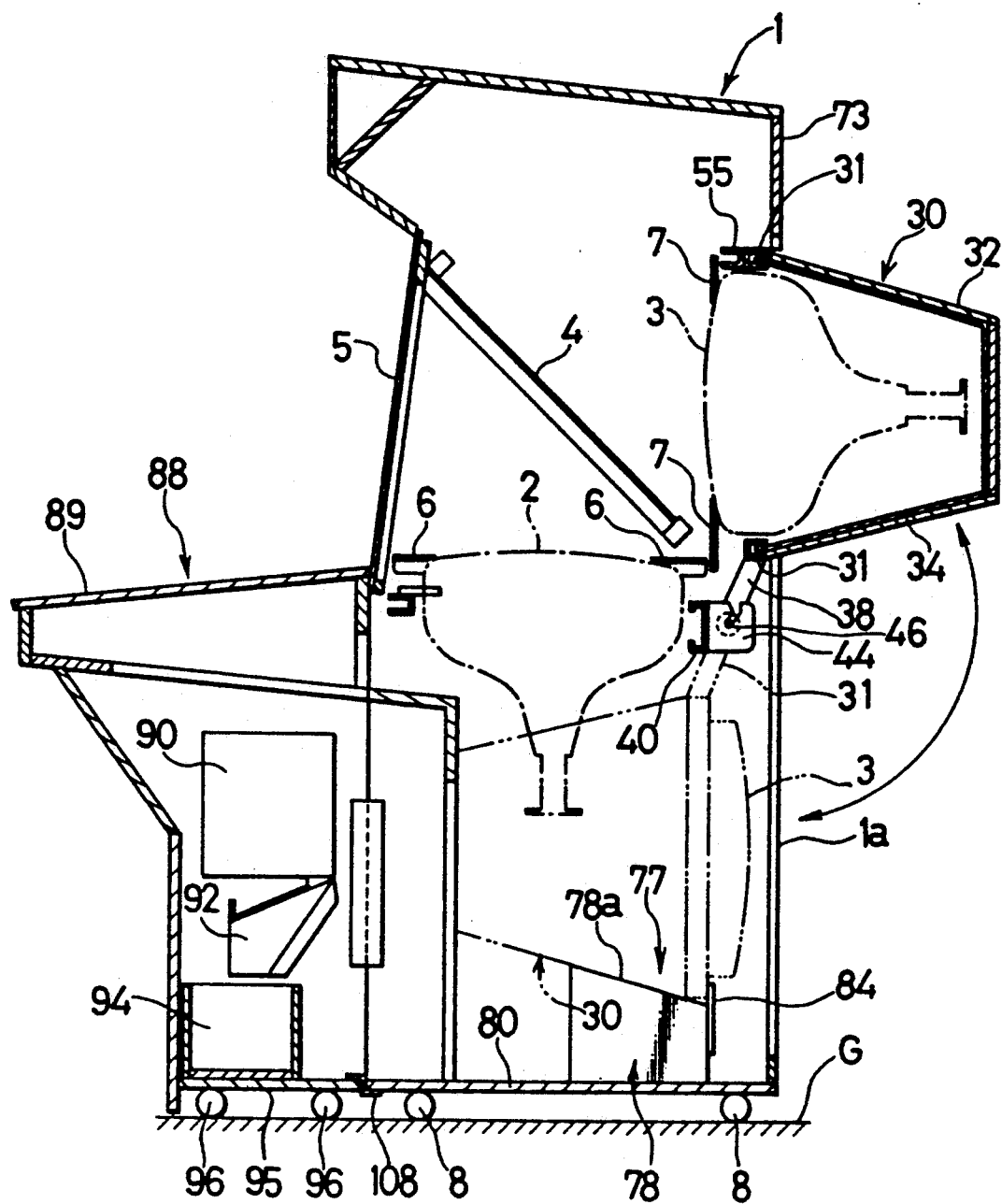
FIG. 1 is a side view in section showing a TV game machine in accordance with the invention.
Figure 2:
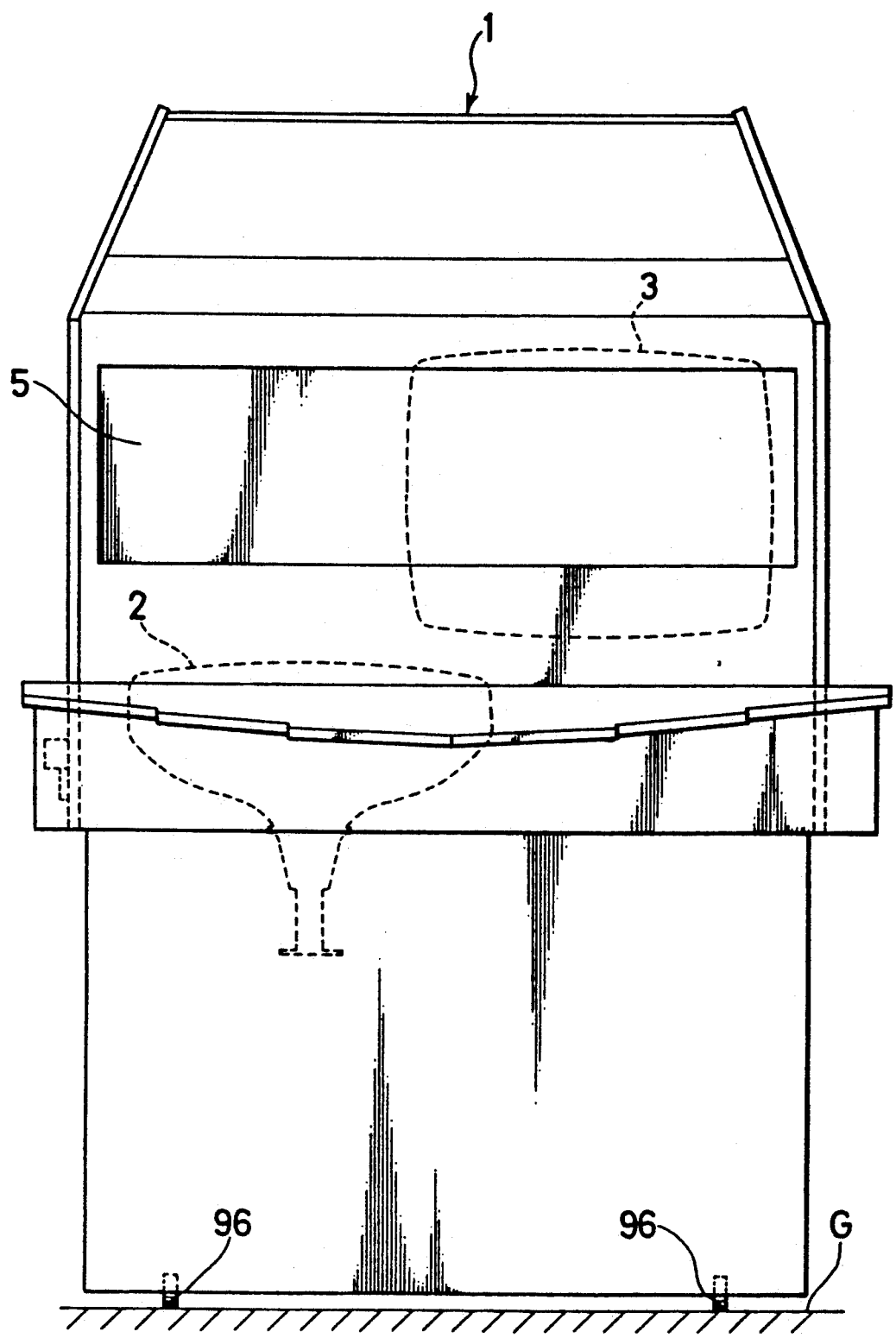
FIG. 2 is a front view showing the TV game machine.

A TV game machine shown in FIGS. 1 and 2 is provided with a main body 1 in the form of a housing to which a first CRT 2 and a second CRT 3 are mounted.

The first CRT 2 is arranged with facing upward in a middle portion of an interior of the machine main body 1. Above the first CRT 2 is disposed a half reflector mirror 4 with inclined forward (at 45 degrees in FIG. 1). An image transmitted from the first CRT 2 and reflected by the half reflector mirror 4 is projected forward of the TV game machine (to the left in FIG. 1) through a transparent plate 5 disposed forward of the mirror 4. The transparent plate 5 serves as a screen over which a wide picture is displayed. The first CRT 2 is arranged at the left side of the interior of the machine main body 1 when viewed from the front. Accordingly, the first CRT 2 projects the image onto the left side of the transparent plate 5 when viewed from the front.

On the contrary, the second CRT 3 is arranged movably between an operative position shown by a one-dot-chain line and an accommodated position shown by a phantom line in FIG. 1. In the operative position, the second CRT 3 is disposed behind the mirror 4 with offset to the right relative to the first CRT 2 when viewed from the front, and faces forward. The mirror 4 extends in a transverse direction of the screen 5 and is so arranged as to display the images transmitted from both the first and second CRTs 2, 3 on the screen 5.

Figure 4:
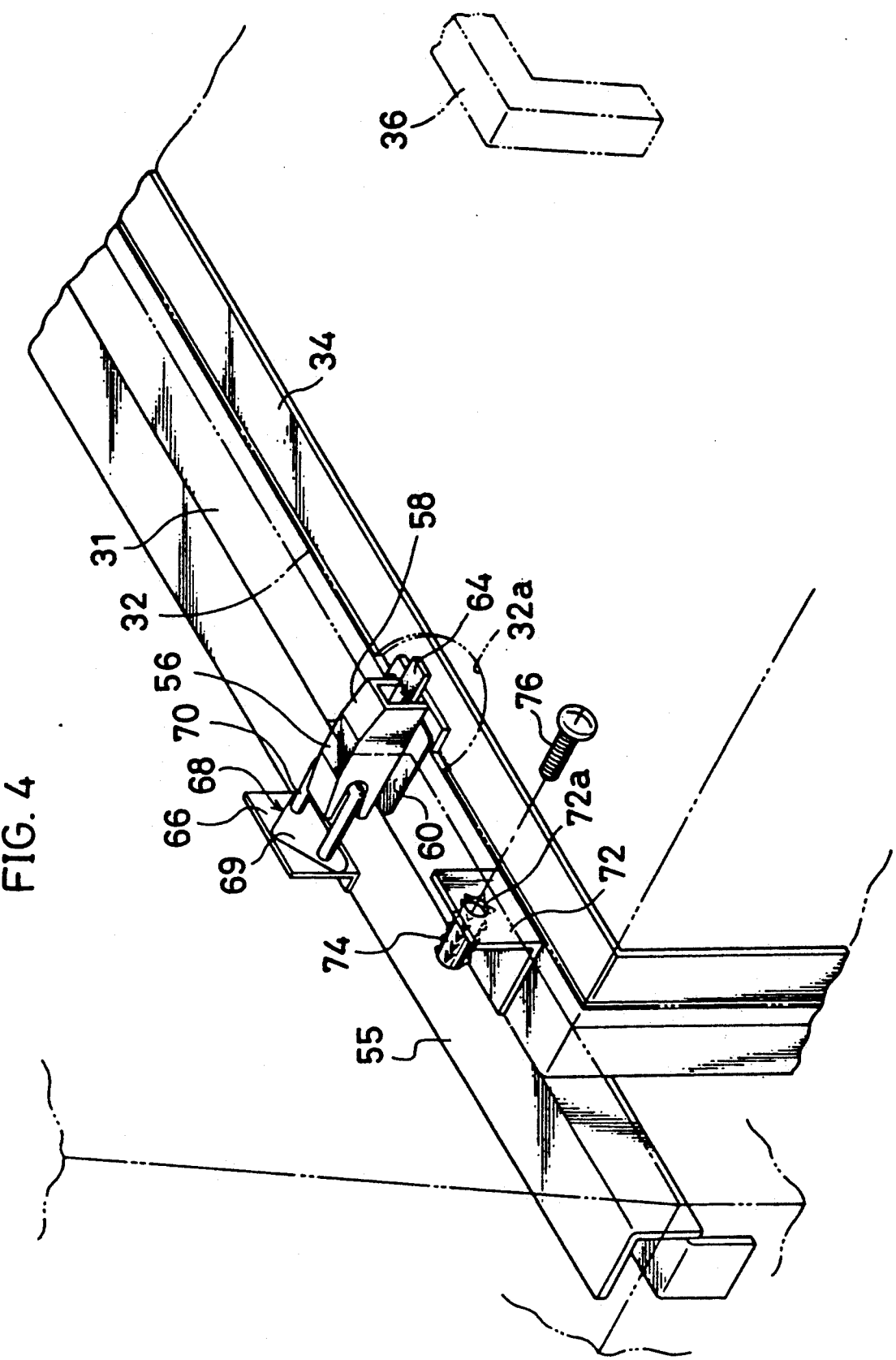
FIG. 4 is a perspective view showing an operative position holder mechanism provided in the TV game machine.

Specifically, the second CRT 3 is accommodated in a movable box 30 having an opening portion facing one direction. Hereafter, the movable box 30 will be described in respect of a case where it is in the operative position. The movable box 30 includes a frame member 31 in the form of a rectangle defining the opening portion and a cover member 32 disposed behind the frame member 31. The cover member 32 covers most of the second CRT 3 and is bolted and secured to a casing 34 connected to the frame 31. A grip handle 36 is provided on an upper surface of the cover member 32 as shown in FIG. 4.

An arm 38 extends downward from each of opposite lateral bottom ends of the frame member 31. Each arm 38, consisting essentially of a base portion 38a and two side portions 38b extending from lateral ends of the base portion 38 perpendicularly to a plane of the base portion 38a, has a U-shaped cross-section. On the other hand, a beam member 40 having a U-shaped cross-section and extending transversely is provided in the machine main body 1. Brackets 42, 44 are secured to a rear face of the beam member 40 at two transversely spaced apart positions. The brackets 42, 44 are respectively U-shaped and L-shaped when viewed from above. A bottom portion of each arm 38 is rotatably connected to the corresponding U-shaped bracket 42. More specifically, a horizontal shaft 46 transversely extending is secured to the bottom portion of the arm 38 with opposite ends of the horizontal shaft 46 projecting outward of the opposite side portions 38b of the arm 38. A slot 45 opening upward is formed in each of opposite side walls 42a of the U-shaped bracket 42. The opposite ends of the horizontal shaft 46 are inserted to the slots 45 from above, whereby the arms 38, movable box 30, and second CRT 3 can be supported to the machine main body 1 integrally and rotatably about the horizontal shaft 46.

The machine main body 1 is provided with an opening portion 1a at a rear wall 73 thereof as shown in FIG. 1. The movable box 30 and the like are movable between positions inside and outside the main body 1 through the opening 1a. In FIG. 1, indicated at 6, 7 are screen shades for masking peripheries of screens of the first and second CRTs 2, 3.

A ratchet wheel 48 having a plurality of ratchet teeth at a periphery thereof is secured at the end of the horizontal shaft 46 opposing the L-shaped bracket 44. Further, between a rearward extending side wall of the L-shaped bracket 44 and the right side wall 42a of the U-shaped bracket 42 (in the drawing of FIG. 3) is provided a pin 50 which extends horizontally. Opposite ends of the pin 50 are secured to the wide wall of the bracket 44 and the right side wall 42a of the bracket 42 respectively. A pawl 52 having a base end and a moving end is pivotally mounted to the pin 50 with the pin 50 inserted through the base end thereof. At the moving end of the pawl 52 is formed a claw 54 which is engageable with one of the ratchet teeth of the ratchet wheel 48. The ratchet teeth are so formed that the arm 38 is pivotable only in such a direction as to become more upright, i.e., in a counterclockwise direction in FIG. 1, when the claw 54 of the pawl 52 is successively brought into engagement with the ratchet teeth due to the weight of the pawl 52.

As shown in FIGS. 1 and 4, another beam member 55 having a U-shaped cross-section and extending horizontally is disposed near an upper portion of the rear wall 73 of the machine main body 1. The beam member 55 is formed and disposed in such a manner that a front face of the frame member 31 of the movable box 30 comes into contact with a rear face of the beam member 55 when the movable box 30 is moved to the operative position. A locking device (operative position locking mechanism) 56 is provided over upper faces of the beam members 31 and 55 for lockingly holding the movable box 30 and CRT 3 in the operative position.

The locking device 56 is of the commercially available type and includes a clutch member 58 and a shackle member 68.

Figure 5:
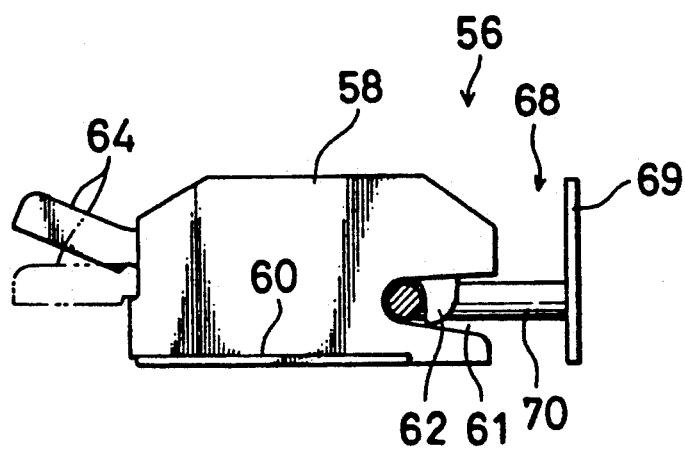
FIG. 5 is a side view partly in section showing a locking device in the operative position holder mechanism.

As shown in FIG. 5, the clutch member 58 has a mounting portion 60 which is secured to the upper face of the frame member 31. At a front portion (right portion in the drawing of FIG. 5) of the clutch member 58 are provided a notch 61 and a clutching claw 62. The clutching claw 62 is movable between a projected position where the claw 62 lies in a space defined by the notch 61, i.e., a position shown in FIG. 5 and a retracted position where the claw 62 is completely concealed in the clutch member 58. At a rear portion (left portion in the drawing of FIG. 5) of the clutch member 58 is provided an operable lever 64. When the operable lever 64 is depressed down from a position indicated by a solid line and another position indicated by a phantom line as shown in FIG. 5, the clutching claw 62 moves from the projected position to the retracted position. On the other hand, upon releasing the depression of the operable lever 64, the clutching claw 62 automatically returns to the projected position. A cut-away portion is formed in the rear wall 73 of the machine main body 1 so as to prevent interference with the clutching member 58 when the movable box 30 is moved from the operative position to the accommodated position, and vice versa.

The shackle member 68 includes a mounting plate 69 and a U-shaped shackle leg 70 provided projectingly from the mounting plate 69. The mounting plate 69 is secured to a rear face of an L-shaped bracket 66 secured upright onto the upper face of the beam member 55. When the movable box 30 is moved to the operative position, the shackle leg 70 is pressed into the notch 61, whereby clutched by the clutching claw 62 as shown in FIG. 5.

It will be appreciated that a variety of commercially available locking devices can be used as operative position locking mechanism for this embodiment. A most suitable locking device may be selected from those locking devices according to a specific construction of the TV game machine.

In this embodiment, another operative position locking mechanism is provided. More specifically, an L-shaped bracket 72 is secured upright onto the upper face of the frame member 31. In the bracket 72 is formed a hole 72a through which a screw 76 is insertable. On the other hand, an internal thread 74 is driven into an appropriate position in the upper portion of the rear wall 73. The screw 76 is spirally fittable to the internal thread 74.

Figure 6:
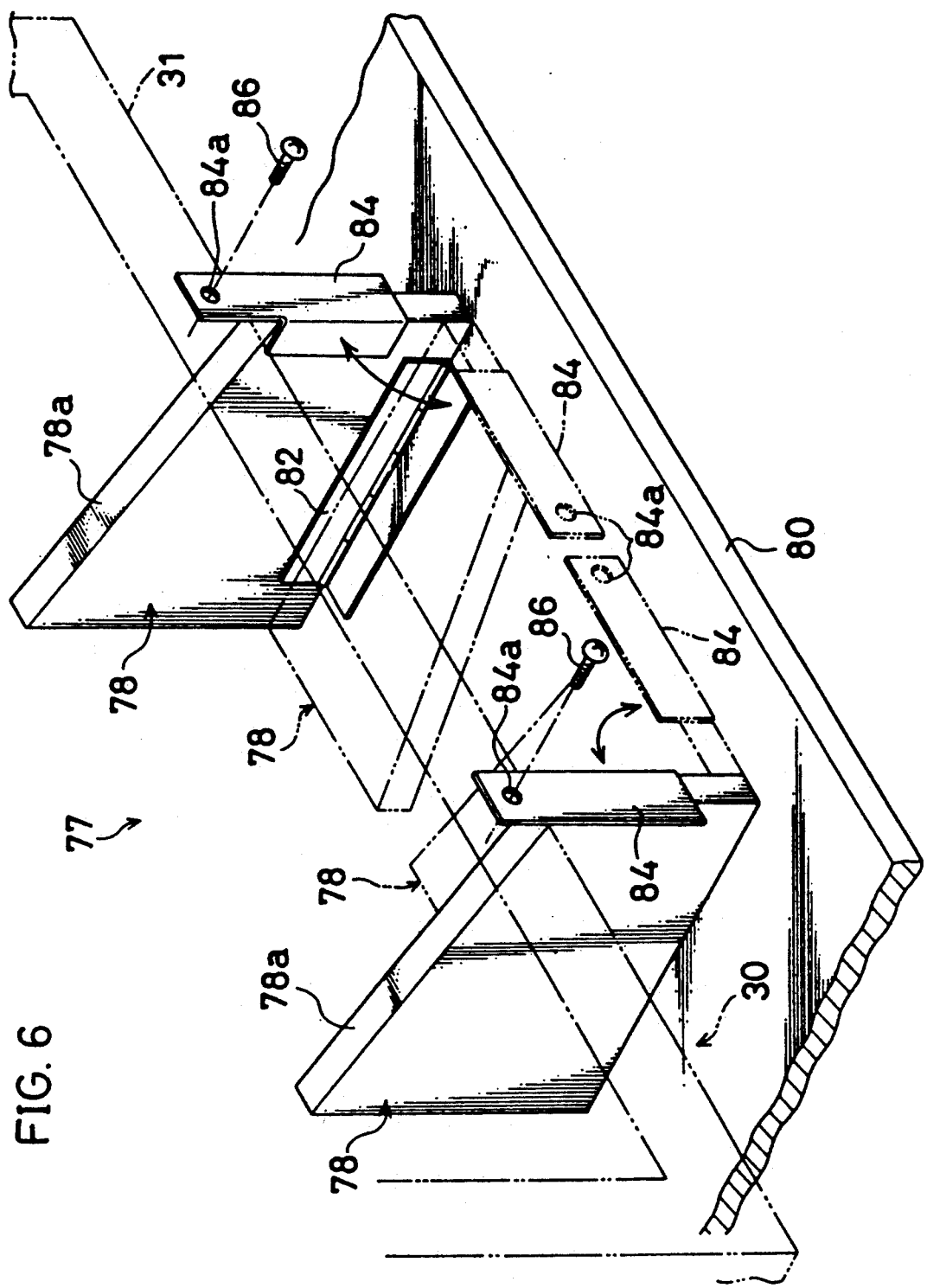
FIG. 6 is a perspective view showing an accommodated position holder mechanism provided in the TV game machine.

Furthermore, an accommodated position locking mechanism 77 as shown in FIG. 6 is provided in an appropriate position in the vicinity of the accommodated position of the movable box 30 within the machine main body 1. The locking mechanism 77 is adapted for holding the movable box 30 and the like in the accommodated position.

The accommodated position locking mechanism 77 is provided with a pair of pivotal plates 78 which are mounted on a bottom wall 80 of the machine main body 1 with hinges 82. The pair of pivotal plates 78 are pivotable between upright positions where the plates shown by solid line in FIG. 6 and lying positions shown by phantom lines in the same figure where the plates 78 are lying on the bottom wall 80. An upper face 78a of each plate 78 is slanting down to a rearward direction in such a manner as to correspond to the slanting upper surface of the cover 32. With the movable box 30 in the accommodated position, the upper faces 78a of the plates 78 are in engagement with the upper surface of the cover 32. It should be noted that the upper surface of the cover 32 is located lower than a lower surface thereof in the accommodated position.

On a rear end face of each pivotal plate 78 is secured a holding plate 84. An upper end portion of the holding plate 84 is projecting upward from the rear end of the plate 78, and a hole 84a is formed in the projected portion of the holding plate 84. A screw 86 is insertable through the hole 84a. Screw holes (unillustrated) are formed on the front face of the frame member 31 in positions corresponding to the holes 84a. The screws 86 are spirally fitted into the corresponding screw holes.

In FIG. 1, indicated at 8 are casters mounted to a lower surface of the bottom wall 80 of the machine main body 1. The casters 8 are designed to rotate over an installation plane G so as to facilitate transportation of the machine main body 1.

Figure 7:
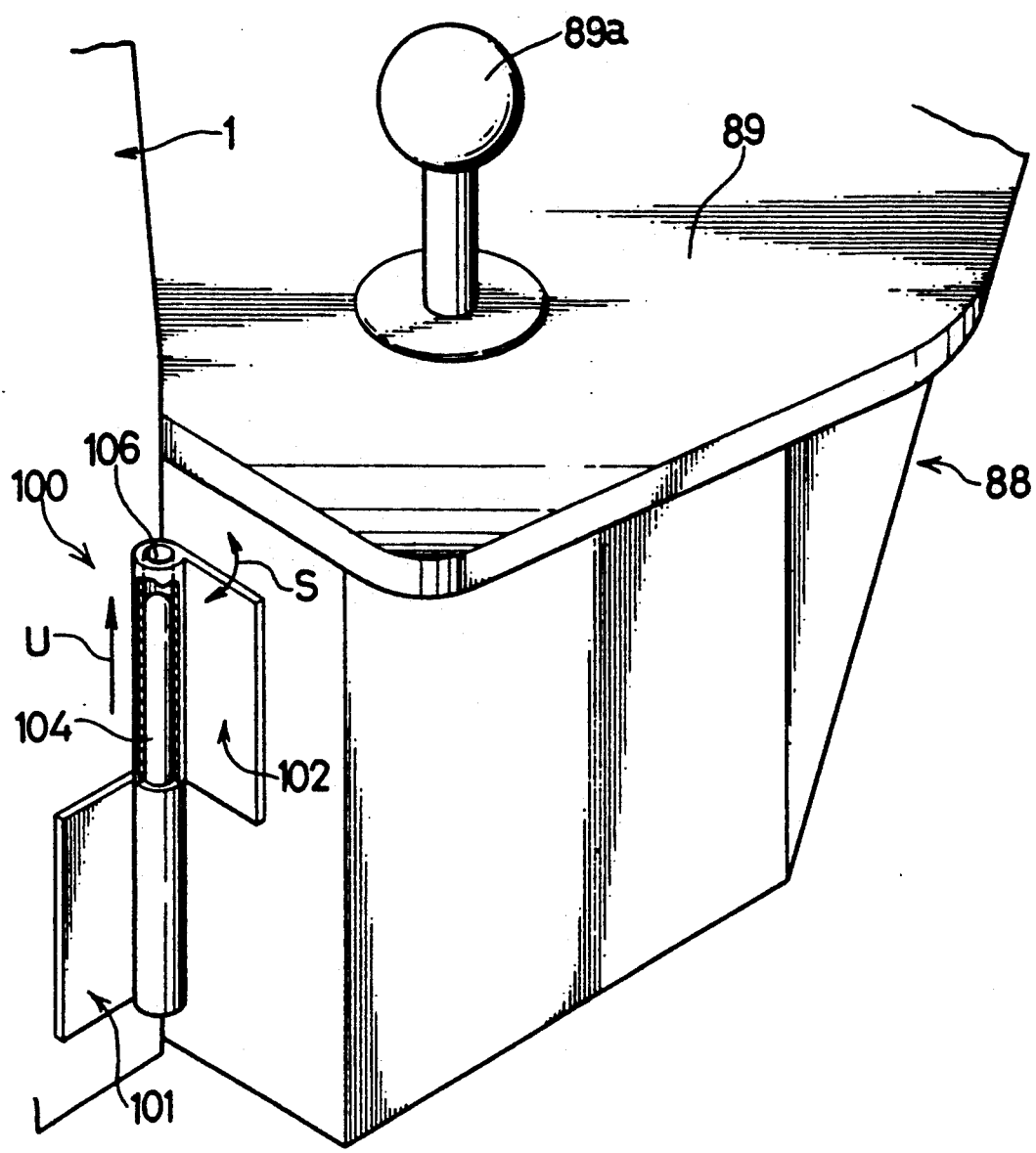
FIG. 7 is a perspective view partly in section showing a mounting arrangement for an operation unit of the TV game machine.

In front of a lower half of a front wall of the machine main body 1 is provided an operation unit 88 as shown in FIGS. 1 and 7. The operation unit 88 has an operation panel 89 disposed at a top portion thereof, and contains a coin collector 90, a coin guide 92, a coin receiving unit 94, etc. Further, casters 96 rollable over the installation plane G are mounted to a lower surface of a bottom wall of the operation unit 88.

The operation unit 88 is attached to the machine main body 1 at a left front side end thereof (see FIG. 2) by means of a hinge mechanism 100 as shown in FIG. 7. The hinge mechanism 100 includes a fixed hinge member 101 secured to a side wall of the machine main body 1 and a movable hinge member 102 secured to a rear wall of the operation unit 88. Each of the hinge members 101, 102 has a flat portion and a cylinder portion. At the cylinder portion of the fixed hinge member 101 is projectingly provided a shaft member 104, and at the cylinder portion of the movable hinge member 102 is formed a cylindrical hole 106 to which the shaft member 104 is fittable. The operation unit 88 is attached to the machine main body 1 rotatably about the shaft member 104 in directions indicated by arrows S in FIG. 7 with the shaft member 104 fitted to the cylindrical hole 106. Where the movable hinge member 102 can no longer be rotated away from the fixed hinge member 101, it is said that the operation unit 88 is in a closed position relative to the machine main body 1.

A stopper member 108 as shown in FIG. 1 is secured to a front end of the bottom wall 80 of the machine main body 1. The stopper member 108 has a Z-shaped cross-section, and consists of an upper portion, a lower portion, and a vertically extending middle portion. The upper and lower portions of the stopper member 108 extend forward and backward from upper and lower ends of the middle portion respectively. The stopper member 108 is secured to the bottom wall 80 with an upper face of the lower portion thereof and a rear face of the middle portion thereof in contact with a front end of the lower surface of the bottom wall 80 and a front face of the bottom wall 80 respectively. When the operation unit 88 is in the closed position relative to the machine main body 1, the upper portion of the stopper member 108 is in contact with a rear end of an upper surface of a bottom wall 95 of the operation unit 88. Thus, such an occurrence can be prevented where the operation unit 88 is lifted relative to the machine main body 1 while a player is playing a game. Further, an unillustrated locking device is provided on the machine main body 1 for locking the operation unit 88 in the closed position.

In FIG. 7, indicated at 89a is an operation lever arranged on the operation panel 89.

FIG. 8 shows a construction of a control system provided in the TV game machine.

In FIG. 8, an input/output port (I/O port) 10 introduces operation information inputted by way of the operation lever 89a, operation switches, etc. to a main CPU 11 in the form of signals. In accordance with the received signals, the main CPU 11 sends a sound control signal and a control signal respectively to a sound CPU 13 and a CRT controller 14. The CRT controller 14 accesses a graphic memory 15 to read necessary frame data and send them to frame memories 16, 17. The frame memories 16, 17 stores the frame data from the CRT controller 14 respectively. The CRT controller 14 alternately sends digital image signals representative of single pictures to be displayed on the CRTs 2, 3, which causes a delay in display of the single pictures which are supposed to be displayed on the CRTs 2, 3 at the same time. In view of this, another frame memory 20 is provided for temporarily storing the digital image signals from the frame memory 17 so as to correct such a delay.

A video signal generator 18 converts the digital image signal from the frame memory 16 into an analog video signal and sends it to the CRT 2. Similarly, a video signal generator 19 converts the digital image signal from the frame memory 20 into an analog video signal and sends it to the CRT 3. Upon receipt of the video signals, the CRTs 2, 3 display on the screens thereof images corresponding to the received video signals. These images are projected onto the screen 5 directly or by way of the half reflector mirror 4, whereby a combined wide picture is produced on the screen 5.

The sound CPU 13 sends a control signal and a sound signal to the sound controller 12 in accordance with the sound control signal from the main CPU 11. The sound controller 12 controls amplification factors of amplifiers 21, 22 in accordance with the control signal from the sound CPU 13 and sends the sound signal from the sound CPU 13 to the amplifiers 21, 22. The amplifiers 21, 22 amplify the sound signals at the amplification factors set by the sound controller 12, and sends the amplified sound signals to speakers 23, 24; 25, 26 respectively. The speakers 23 to 26 convert the received sounds signals into sounds and output.

Next, there will be described ways of using and transporting this TV game machine.

When the TV game machine is to be used, the operation unit 88 is attached to the lower front surface of the machine main body 1 and the second CRT 3 is set in the operative position.

Specifically, the operation unit 88 is attached to the machine main body 1 as follows. Firstly, the operation unit 88 is lifted, and then lowered in such a manner that the shaft member 104 of the fixed hinge member 101 is fitted to the cylindrical hole 106 formed in the movable hinge member 102 as shown in FIG. 7. Thus, the operation unit 88 is attached to the machine main body 1 rotatably about the shaft member 104. In this state, the operation unit 88 is rotated up to the closed position while causing the casters 96 to rotate over the installation plane G, and locked therein. The operation unit 88 can be fixedly attached to the machine main body 1 in this way.

Figure 3:
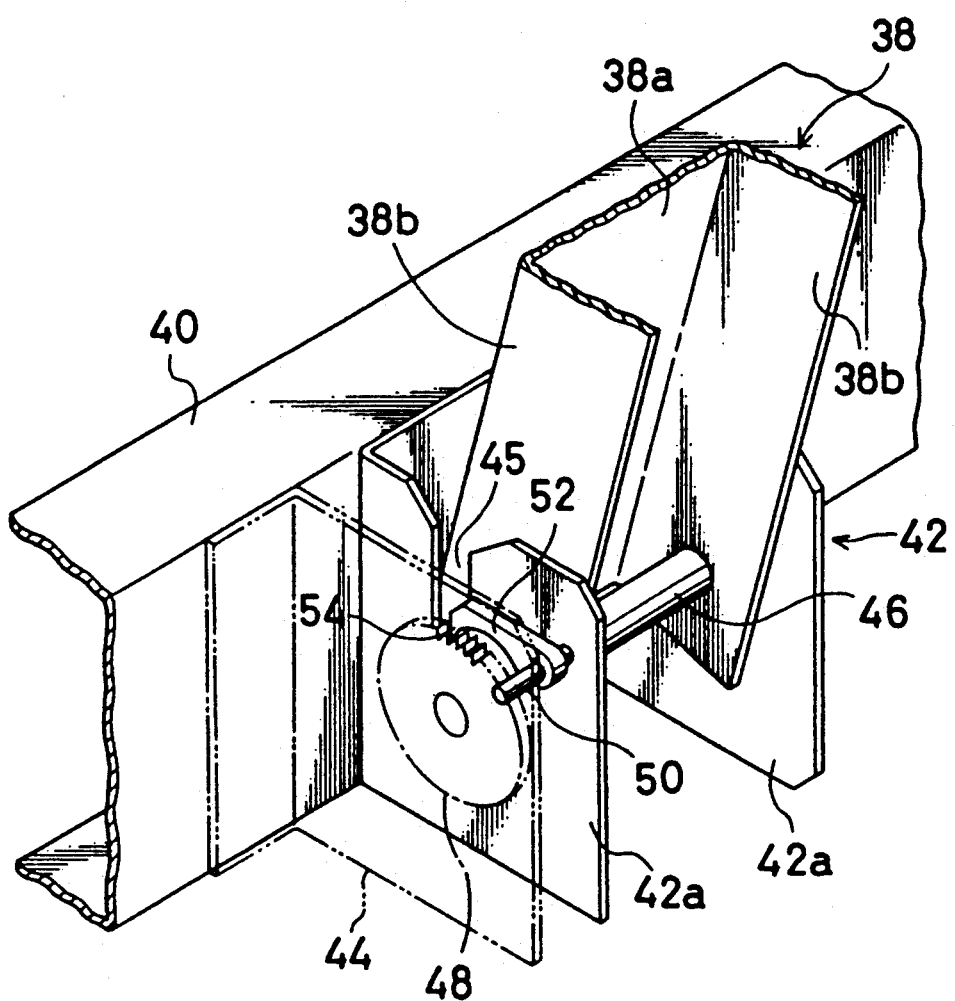
FIG. 3 is a perspective view partly in section showing an arm mounting portion of the TV game machine.

The second CRT 3 is set as follows. The movable box 30 containing the second CRT 3 therein is rotated upward about the horizontal shaft 46 up to the operative position, i.e., a position where the frame member 31 of the box 30 is in contact with the beam member 55. Even in the case where one accidentally unhands the movable box 30 while moving the same, the downward rotation of the box 30 due to the weight thereof can be prevented by engagement of the claws 54 of the pawls 52 with ratchet teeth of the ratchet wheels 48 as shown in FIG. 3. This guarantees the safety during the rotating operation of the movable box 30.

When the movable box 30 reaches the operative position, the shackle member 70 mounted on the machine main body 1 is fitted into the notch 61 of the clutching member 58 mounted on the box 30 and engaged with the claw 62 of the clutch member 58. Thereby, the box 30 and second CRT 3 are fixedly mounted to the machine main body 1 through the locking device 56 in the operative position. Further, the box 30 and second CRT 3 can be completely fixed in the operative position by spirally fitting the screw 76 into the internal thread 74 provided in the machine main body 1 through the hole 72a defined in the bracket 72 shown in FIG. 4.

With the second CRT 3 thus set in the operative position, the image produced thereby is projected forward through the half reflector mirror 4 while the image produced by the first CRT 2 is reflected by the mirror 4 and projected forward. In this way, there can be produced on the screen 5 a wide picture which provides a dynamic atmosphere with lots of presence.

In the case where this TV game machine is transported to another location, the second CRT 3 and movable box 30 are accommodated in the accommodated position within the machine main body 1 and the operation unit 88 is detached from the machine main body 1.

The second CRT 3 is moved to the accommodated position as follows. Firstly, the screw 76 is removed from the internal thread 74 and the operable lever 64 of the clutch member 58 is depressed to bring the claw 62 into the accommodated position. Thereby, the movable box 30 is released from the fixedly held state thereof by means of the locking device 56. Then, a finger or the like is inserted between the side wall 42a of the bracket 42 and the bracket 44 shown in FIG. 3 to lift the pawl 52, thereby disengaging the claw 54 of the pawl 52 from the ratchet tooth of the ratchet wheel 48. In this way, the arms 38, movable box 30, and second CRT 3 are made rotatable downward together.

Such downward rotation brings the movable box 30 into the accommodated position within the machine main body 1 through the opening 1a defined in the machine main body 1. The pivotal plates 78 shown in FIG. 6 are laid to the lying positions (phantom lined positions) before the movable box 30 is moved to the accommodated position. Upon the box 30 reaching the accommodated position, the pivotal plates 78 are raised to the upright positions (solid lined positions). The upper faces 78a of the plates 78 come into engagement with the lower face of the movable box 30 and thereupon the box 30 is supported from below by the plates 78 and the upper end of the holding plate 84 comes into substantial contact with the front face of the beam member 31 of the box 30. In this state, the screws 86 are spirally fitted into the screw holes formed in the beam member 31 through the holes 84a, and thereby the box 30 and second CRT 3 can be held in the accommodated position. What should be noted here is that dead space within the machine main body 1 is made use of to accommodate the second CRT 3.

The operation unit 88 is detached from the machine main body 1 as follows. Firstly, an unillustrated locking device is unlocked and the operation unit 88 is turned about the shaft member 104 in a clockwise direction when viewed from above in FIG. 7. Then, the operation unit 88 is lifted in an arrow direction U in FIG. 7 to disengage the movable hinge member 102 from the fixed hinge member 101, and thereby the operation unit 88 is detached from the machine main body 1. In a state where the operation unit 88 is detached and the movable box 30 and the like are accommodated within the machine main body 1, the depth of the TV game machine is greatly reduced compared to that of the TV game machine in an operative state shown in FIG. 1. In this state, the machine main body 1 can be carried easily through even narrow space. Further, the second CRT 3 is accommodated within the machine main body 1, which obviates the undesired likelihood that the second CRT 3 is struck against external obstacles and damaged.

Particularly in the recent years, large-sized TV game machines have become available with which a plurality of players can simultaneously play a game. Application of the invention to the large-sized TV game machines facilitates transportation of these machines to the game parlors, which have been conventionally troublesome due to the space limitation, and therefore the effect of the invention will be enhanced.

Further, in the foregoing embodiment, the movable box 30 and the like are fixedly held in the accommodated position by means of the accommodated position holder mechanism 77. This eliminates the likelihood that the box 30 and the like become shaky while being transported.

Moreover, in the foregoing embodiment, the operation unit 88 is rotatable frontward away from the machine main body 1 about the hinge mechanism 100 when mounted to the main body 1. Accordingly, maintenance of the main body 1 can be easily and readily conducted with the operation unit 88 rotated away from the main body 1. It will be appreciated that the present invention is not limited to the foregoing embodiment, but may also be embodied as follows.

(1) In the foregoing embodiment, the operation unit 88 is detachable from the machine main body 1. However, the operation unit 88 is not particularly required to be detachable from the main body 1 unless it projects from the main body 1. Even with the operation unit 88 fixedly mounted to the main body 1 and projecting therefrom, if the second CRT 3 is movable between the operative position and accommodated position, the depth of the TV game machine can be reduced at least by the depth of the second CRT 3.

(2) In the foregoing embodiment are shown three operative position holder mechanisms: a ratchet mechanism including the ratchet wheel 48, etc.; locking device 56; and screw 76. However, in accordance with the invention, provision of at least one operative position holder mechanism will accomplish the purpose thereof. Yet, it should be understood that the second CRT 3 and the like will be held in the operative position with improved safety if two or more such holder mechanisms are provided as in the foregoing embodiment.

Further, the invention does not specify a construction of the operative position holder mechanism. Any known mechanism is applicable provided that it is capable of fixedly holding the second CRT 3 in the operative position while the second CRT 3 is used.

(3) In the foregoing embodiment, there are provided the arms 38 extending from the movable box 30 and the second CRT 3 is made rotatable about the ends of the arms 38. However, in accordance with the invention, it is sufficient to locate a center of rotation below the second CRT 3 and a specific position may be set according to the construction of the TV game machine. By setting the center of rotation below the second CRT 3, the accommodated position of the second CRT 3 can be set in an even lower position. Accordingly, even in the case where the first CRT 3 is relatively large, the second CRT 3 can be accommodated within the machine main body 1 without interference with the first CRT 2.

As described above, the invention pertains to a TV game machine provided with first and second CRTs in which the second CRT is made rotatable between an operative position where the second CRT projects rearward from a machine main body and an accommodated position located lower than the operative position and within the machine main body and an operative position holder mechanism is provided to hold the second CRT in the operative position. Accordingly, a satisfactory wide picture can be produced on a screen by the first and second CRTs similarly to the existing TV game machines. Further, the second CRT can be accommodated within the machine main body, making use of the dead space therein. The second CRT can be protected from external obstacles and the depth of the TV game machine can be reduced, thereby enabling convenient and easy transportation of the TV game machine even through narrow space. Particularly, if the invention is applied to large-sized multi-player TV game machines, transportation of these machines into game parlors as they are, which has been impossible in the past, is made possible.

Further, since the second CRT is held in the accommodated position by means of an accommodated position holder mechanism, movement of the second CRT during transportation can be prevented, thereby realizing safer transportation.

Moreover, since an operation unit is detachable from a front portion of the TV game machine, transportation of the machine main body can be further facilitated. Also, since operation unit is rotatable away from the machine main body in its mounted state, maintenance of the machine main body can be easily conducted.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A display device for displaying a wide picture comprising:
   a housing having a front portion and a rear portion;
   a main screen provided in the front portion of the housing over which the wide picture is to be produced;
   first picture projector means including a first picture generation unit having a first screen facing in a vertical direction;
   first picture transmission means for transmitting a picture produced on the first screen to the main screen;
   second picture projector means including a second picture generation unit movable between an accommodated position where the second picture generation unit is accommodated in the housing and an operative position where the picture generation unit is projected from the rear portion of the housing, and having a second screen facing in a horizontal direction when the second picture generation unit is in the operative position;
   second picture transmission means for transmitting a picture projected on the second screen to the main screen;

the first picture projector means and the second picture projector means when in the operative position being arranged so that an image from the first picture projector means is displayed on the main screen in non-overlapping juxtaposition to an image from the second picture projector means;

a supporting member for supporting the second picture generation unit, the supporting member being rotatable about a pivot provided on the housing at such a position that the second picture generation unit does not come into contact with the first picture generation unit when being moved from the accommodated position to the operative position, and vice versa; and a holding member for holding the second picture generation unit in the operative position.

2. A display device as defined in claim 1 wherein the first and second picture generation units are cathode ray tubes.

3. A display device as defined in claim 1 wherein the accommodated position of the second picture generation unit is located in a lower portion of the housing.

4. A display device for displaying a wide picture comprising:

a housing having a front portion and a rear portion;

a main screen provided in the front portion of the housing over which the wide picture is to be produced;

first picture projector means including a first picture generation unit having a first screen facing in a vertical direction;

first picture transmission means for transmitting a picture produced on the first screen to the main screen;

second picture projector means including a second picture generation unit movable between an accommodated position where the second picture generation unit is accommodated in the housing and an operative position where the picture generation unit is projected from the rear portion of the housing, and having a second screen facing in a horizontal direction when the second picture generation unit is in the operative position;

second picture transmission means for transmitting a picture projected on the second screen to the main screen;

the first picture projection means and the second picture projector means when in the operative position being arranged so that an image from the first picture projector means is displayed on the main screen in non-overlapping juxtaposition to an image from the second picture projector means; and first holder means for holding the second picture generation unit in the operative position, the first holder means including container means for accommodating the second picture generation unit and an arm having one end which is fixedly attached to the container means and the other end of which is rotatably mounted to the housing at a specified position.

5. A display device for displaying a wide picture comprising:

a housing having a front portion and a rear portion;

a main screen provided in the front portion of the housing over which the wide picture is to be produced;

first picture projector means including a first picture generation unit having a first screen facing in a vertical direction;

first picture transmission means for transmitting a picture produced on the first screen to the main screen;

second picture projector means including a second picture generation unit movable between an accommodated position where the second picture generation unit is accommodated in the housing and an operative position where the picture generation unit is projected from the rear portion of the housing, and having a second screen facing in a horizontal direction when the second picture generation unit is in the operative position;

second picture transmission means for transmitting a picture projected on the second screen to the main screen;

the first picture projector means and the second picture projector means when in the operative position being arranged so that an image from the first picture projector means is displayed on the main screen in non-overlapping juxtaposition to an image from the second picture projector means; and first holder means for holding the second picture generation unit in the operative position, the first holder means including a ratchet mechanism for restricting rotation of the second picture generation unit from the operative position to the accommodated position.

6. A display device for displaying a wide picture comprising:

a housing having a front portion and a rear portion;

a main screen provided in the front portion of the housing over which the wide picture is to be produced;

first picture projector means including a first picture generation unit having a first screen facing in a vertical direction;

first picture transmission means for transmitting a picture produced on the first screen to the main screen;

second picture projector means including a second picture generation unit movable between an accommodate position where the second picture generation unit is accommodated in the housing and an operative position where the picture generation unit is projected from the rear portion of the housing, and having a second screen facing in a horizontal direction when the second picture generation unit is in the operative position;

second picture transmission means for transmitting a picture projected on the second screen to the main screen;

the first picture projector means and the second picture projector means when in the operative position being arranged so that an image from the first picture projector means is displayed on the main screen in non-overlapping juxtaposition to an image from the second picture projector means; and first holder means for holding the second picture generation unit in the operative position, the first holder means including locking means having a shackle member fixedly mounted to the housing, and clutch means fixedly mounted to the second picture generation unit, said clutch means being disengageable and engageable with the shackle member.

7. A display device for displaying a wide picture comprising:

a housing having a front portion and a rear portion;

a main screen provided in the front portion of the housing over which the wide picture is to be produced;

first picture projector means including a first picture generation unit having a first screen facing in a vertical direction;

first picture transmission means for transmitting a picture produced on the first screen to the main screen;

second picture projector means including a second picture generation unit movable between an accommodated position where the second picture generation unit is accommodated in the housing and an operative position where the picture generation unit is projected from the rear portion of the housing, and having a second screen facing in a horizontal direction when the second picture generation unit is in the operative position;

second picture transmission means for transmitting a picture projected on the second screen to the main screen;

the first picture projector means and the second picture projector means when in the operative position being arranged so that an image from the first picture projector means is displayed on the main screen in non-overlapping juxtaposition to an image from the second picture projector means; and first holder means for holding the second picture generation unit in the operative position, the first holder means including:

an internal thread member fixedly provided in the housing;

a screw spirally fittable to the internal thread member; and a bracket member mounted to the second picture generation unit and having a hole through which the screw is insertable at a position in agreement with the internal thread member when the second picture generation unit is in the operative position.

8. A display device for displaying a wide picture comprising:

a housing having a front portion and a rear portion;

a main screen provided in the front portion of the housing over which the wide picture is to be produced;

first picture projector means including a first picture generation unit having a first screen facing in a vertical direction;

first picture transmission means for transmitting a picture produced on the first screen to the main screen;

second picture projector means including a second picture generation unit movable between an accommodated position where the second picture generation unit is accommodated in the housing and an operative position where the picture generation unit is projected from the rear portion of the housing, and having a second screen facing in a horizontal direction when the second picture generation unit is in the operative position;

second picture transmission means for transmitting a picture projected on the second screen to the main screen;

the first picture projector means and the second picture projector means when in the operative position being arranged so that an image from the first picture projector means is displayed on the main screen in non-overlapping juxtaposition to an image from the second picture projector means;

first holder means for holding the second picture generation unit in the operative position; and second holder means for holding the second picture generation unit in the accommodated position, the second holder means including:

a pair of support members arranged spaced apart in a transverse direction of the housing in the vicinity of the accommodated position of the second picture generation unit within the housing, each support member being pivotable and having an upright position;

a structure element fixed to a rear end of each support member in such a manner as to project upward from the rear end; and the support members and the structure elements being configured so as to hold the second picture generation unit in the accommodated position with the support members in the respective upright positions.

9. A display device for displaying a wide picture comprising:

a housing having a front portion and a rear portion;

a main screen provided in the front portion of the housing over which the wide picture is to be produced;

first picture projector means including a first picture generation unit having a first screen facing in a vertical direction;

first picture transmission means for transmitting a picture produced on the first screen to the main screen;

second picture projector means including a second picture generation unit movable between an accommodated position in the housing and an operative position where the second picture generation unit is projected from the rear portion of the housing, and having a second screen facing in a horizontal direction when the second picture generation unit is in the operative position;

second picture transmission means for transmitting a picture projected on the second screen to the main screen;

the first picture projector means and the second picture projector means when in the operative position being arranged so that an image from the first picture projector means is displayed on the main screen in non-overlapping juxtaposition to an image from the second picture projector means;

first holder means for holding the second picture generation unit in the operative position;

an operation unit detachable and mountable to the front portion of the housing, the operation unit being rotatable between an open position where the operation unit is away from the front portion of the housing and a closed position where the operation unit substantially covers the front portion of the housing;

fixed hinge means fixed to one side surface of the housing and having a vertical axis;

movable hinge means fixed to the operation unit at a position corresponding to the fixed hinge means; and the fixed and movable hinge means being constructed such that the movable hinge means is engageable and vertically disengageable with the fixed hinge means; and the moveable hinge means is rotatable about the vertical axis of the fixed hinge means in an engaged state with the fixed hinge means.

10. A display device as defined in claim 9 further comprising a stopper member fixed to a front end of the housing and configured so as to restrict lifting of the operation unit relative to the housing when the operation unit is in the closed position.

11. A display device as defined in claim 9 further comprising caster means mounted to a bottom surface of the operation unit and rollable over a plane where the display device is installed.

* * * * *

UNITED STATES PATENT AND TRADEMARK OFFICE
CERTIFICATE OF CORRECTION

PATENT NO.   : 5,276,524
DATED        : January 4, 1994
INVENTOR(S)  : Masahiro Inoue, et al It is certified that error appears in the above-indentified patent and that said Letters Patent is hereby corrected as shown below:

On the Title Page, Item [73] change the assignee from "Konami Kogyo Kabushiki Kaisha" to --Konami Co., Ltd.--.

Signed and Sealed this

Second Day of August, 1994

*Attest:*

BRUCE LEHMAN

*Attesting Officer*      Commissioner of Patents and Trademarks